(12) United States Patent
Candelaria et al.

(10) Patent No.: US 9,984,097 B2
(45) Date of Patent: May 29, 2018

(54) SYSTEMS AND COMPUTER PROGRAM PRODUCTS FOR TRANSFERRING RESERVES WHEN MOVING VIRTUAL MACHINES ACROSS SYSTEMS

(75) Inventors: Susan K. Candelaria, Tucson, AZ (US); Mark P. Gardiner, Albany, NY (US); Clint A. Hardy, Tucson, AZ (US); Matthew J. Kalos, Tucson, AZ (US); William R. White, Endwell, NY (US); Stephen G. Wilkins, Berkshire, NY (US); Harry M. Yudenfriend, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 161 days.

(21) Appl. No.: 12/943,874

(22) Filed: Nov. 10, 2010

(65) Prior Publication Data
US 2012/0117196 A1 May 10, 2012

(51) Int. Cl.
*G06F 15/16* (2006.01)
*G06F 17/30* (2006.01)

(52) U.S. Cl.
CPC ............... *G06F 17/30233* (2013.01)

(58) Field of Classification Search
CPC ........... G06F 13/18; G06F 2009/45562; H04L 29/08072; H04L 29/06
USPC ........ 709/219, 213, 214; 711/151, 152, 153; 718/1, 104
See application file for complete search history.

(56) References Cited

U.S. PATENT DOCUMENTS

| | | | | |
|---|---|---|---|---|
| 6,148,339 | A  * | 11/2000 | Nagamatsu | ......... H04L 41/0622 709/202 |
| 6,226,717 | B1 | 5/2001 | Reuter et al. | |
| 6,311,206 | B1 * | 10/2001 | Malkin et al. | ................ 709/202 |
| 6,453,392 | B1 | 9/2002 | Flynn, Jr. | |
| 6,826,123 | B1 * | 11/2004 | Herring | .................. G04G 5/002 368/46 |
| 7,577,722 | B1 * | 8/2009 | Khandekar | ......... G06F 9/45558 709/220 |
| 9,852,154 | B2 | 12/2017 | Candelaria et al. | |
| 2002/0069335 | A1 * | 6/2002 | Flylnn, Jr. | ..................... 711/153 |

(Continued)

OTHER PUBLICATIONS

U.S. Appl. No. 13/483,731, filed May 30, 2012.
(Continued)

*Primary Examiner* — Liangche A Wang
*Assistant Examiner* — Sherman Lin
(74) *Attorney, Agent, or Firm* — Zilka-Kotab, P.C.

(57) ABSTRACT

According to one embodiment, a host system includes logic adapted for receiving device information from a source system, logic adapted for building a virtual device based at least in part on the received device information, logic adapted for transferring a reserve of a storage device to the host system and/or receiving results of transferring the reserve to the host system, logic adapted for determining if the reserve is held by the host system, logic adapted for recording the reserve if the reserve is held by the host system, and logic adapted for sending a notification that the reserve is not held by the host system if the reserve is not held by the host system. Other systems and computer program products are also described according to various embodiments.

20 Claims, 10 Drawing Sheets

(56) References Cited

U.S. PATENT DOCUMENTS

| | | | |
|---|---|---|---|
| 2004/0068563 A1* | 4/2004 | Ahuja | G06F 9/52 709/225 |
| 2006/0005189 A1* | 1/2006 | Vega et al. | 718/1 |
| 2008/0127182 A1* | 5/2008 | Newport | G06F 9/4856 718/1 |
| 2008/0201479 A1* | 8/2008 | Husain et al. | 709/227 |
| 2009/0094243 A1* | 4/2009 | Oshri et al. | 707/8 |
| 2012/0054367 A1 | 3/2012 | Ramakrishnan et al. | |
| 2012/0246277 A1 | 9/2012 | Candelaria et al. | |

OTHER PUBLICATIONS

Non-Final Office Action from U.S. Appl. No. 13/483,731 dated Aug. 20, 2012.
Final Office Action from U.S. Appl. No. 13/483,731 dated Dec. 18, 2012.
Non-Final Office Action from U.S. Appl. No. 13/483,731 dated Jun. 6, 2014.
Final Office Action from U.S. Appl. No. 13/483,731, dated Jan. 5, 2015.
Final Office Action from U.S. Appl. No. 13/483,731, dated May 12, 2016.
Non-Final Office Action from U.S. Appl. No. 13/483,731, dated Oct. 8, 2015.
Notice of Allowance from U.S. Appl. No. 13/483,731, dated Jan. 12, 2016.
Candelaria et al., U.S. Appl. No. 15/842,728, filed Dec. 14, 2017.
Notice of Allowance from U.S. Appl. No. 13/483,731, dated Sep. 5, 2017.

* cited by examiner

SYSTEMS AND COMPUTER PROGRAM PRODUCTS FOR TRANSFERRING RESERVES WHEN MOVING VIRTUAL MACHINES ACROSS SYSTEMS

BACKGROUND

The present invention relates to data storage systems, and more particularly, this invention relates to methods and systems for maintaining data integrity when moving virtual machines across systems.

In many storage systems, there are instances in which a device in a storage unit is held such that a specific host system has exclusive access to the device. This is typically accomplished by issuing a command from a host system to a control unit which controls the device. The exclusive access to the device is maintained by the host system until the host releases this exclusive access. In general, this command may be held in order to maintain consistency of data on this device when changes are occurring, e.g., another server is not able to access the data on this held device while the host system makes changes to the data on the device. In addition to holding this device, there are conditions in which the host system may transfer this exclusive access to this device to another (host) system. In typical storage systems, this can be done by the target host system querying the current state of the device that is being held to verify that the source host is actually holding the access to this device. After this point, the target host system or source host system issues an unconditional command to take or reassign the access to this device unconditionally. By unconditionally, what is meant is that this command takes control of or reassigns the access to this device regardless of any other ownership or control by another entity, e.g., this unconditional command takes the access to this device no matter which entity is holding the device.

BRIEF SUMMARY

According to one embodiment, a host system includes logic adapted for receiving device information from a source system, logic adapted for building a virtual device based at least in part on the received device information, logic adapted for transferring a reserve of a storage device to the host system and/or receiving results of transferring the reserve to the host system, logic adapted for determining if the reserve is held by the host system, logic adapted for recording the reserve if the reserve is held by the host system, and logic adapted for sending a notification that the reserve is not held by the host system if the reserve is not held by the host system.

In another embodiment, a source system includes logic adapted for creating a reserve of a storage device, logic adapted for sending device information to a target system, logic adapted for receiving an indication that the virtual device build is complete from the target system, logic adapted for transferring the reserve to the target system, and logic adapted for sending results of transferring the reserve to the target system.

According to another embodiment, a computer program product for transferring a virtual device includes a computer readable storage medium having computer readable program code embodied therewith, the computer readable program code includes computer readable program code configured to receive device information from a source system, computer readable program code configured to build a virtual device on a target system based at least in part on the received device information, computer readable program code configured to transfer a reserve of a storage device and/or receive results of transferring the reserve to the target system, computer readable program code configured to determine if the reserve is held by the target system and to record the reserve if the reserve is held by the target system, and computer readable program code configured to send a notification that the reserve is not held by the target system if the reserve is not held by the target system.

Other aspects and embodiments of the present invention will become apparent from the following detailed description, which, when taken in conjunction with the drawings, illustrates by way of example the principles of the invention.

DETAILED DESCRIPTION

Figure 1:
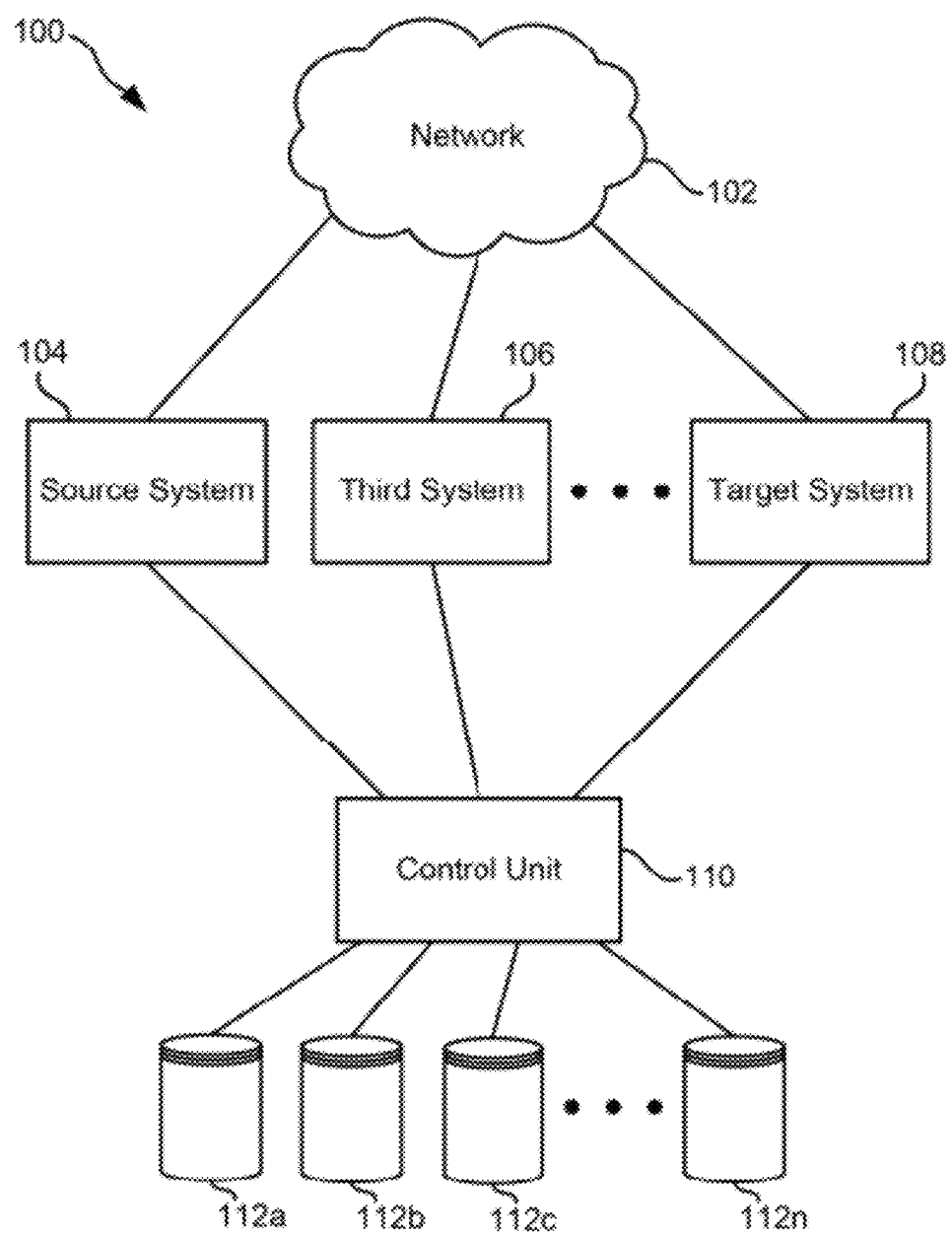
FIG. 1 illustrates a system architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description describes methods and systems for maintaining data integrity when moving virtual devices across systems. According to one embodiment, a manage reserve command may be implemented in existing storage devices, storage systems, logic, etc. The manage reserve command may be a push and/or pull reserve command, as described in detail herein. This command may be used in various embodiments. A source system that holds a reserve on a storage device may be able to issue this command in order to transfer the device reserve to another host (target) system or the target host system may issue this command to take the reserve if the specified source system holds the reserve on the device. This enables the system to be able to transfer this reserve atomically without the possibility of losing exclusive access to the device, so that data integrity is maintained throughout the transfer of the reserve, according to preferred embodiments.

In one general embodiment, a host system includes logic adapted for receiving device information from a source system, logic adapted for building a virtual device based at least in part on the received device information, logic adapted for transferring a reserve of a storage device to the host system and/or receiving results of transferring the reserve to the host system, logic adapted for determining if the reserve is held by the host system, logic adapted for recording the reserve if the reserve is held by the host system, and logic adapted for sending a notification that the reserve is not held by the host system if the reserve is not held by the host system.

In another general embodiment, a source system includes logic adapted for creating a reserve of a storage device, logic adapted for sending device information to a target system, logic adapted for receiving an indication that the virtual device build is complete from the target system, logic adapted for transferring the reserve to the target system, and logic adapted for sending results of transferring the reserve to the target system.

In another general embodiment, a method includes receiving device information from a source system, building a virtual device on a host system based at least in part on the received device information, transferring a reserve of a device stored on a storage device to a target system and/or receiving results of transferring the reserve to the target system, determining if the reserve is held by the target system, recording the reserve if the reserve is held by the target system, and sending a notification that the reserve is not held by the target system if the reserve is not held by the target system.

In yet another general embodiment, a computer program product for transferring a virtual device includes a computer readable storage medium having computer readable program code embodied therewith, the computer readable program code includes computer readable program code configured to receive device information from a source system, computer readable program code configured to build a virtual device on a target system based at least in part on the received device information, computer readable program code configured to transfer a reserve of a storage device and/or receive results of transferring the reserve to the target system, computer readable program code configured to determine if the reserve is held by the target system and to record the reserve if the reserve is held by the target system, and computer readable program code configured to send a notification that the reserve is not held by the target system if the reserve is not held by the target system.

According to one embodiment, a manage reserve command may be implemented in existing storage devices, storage systems, logic, etc. The manage reserve command may be a push and/or pull reserve command, as described in detail herein. This command may be used in various embodiments. A source system that holds a reserve on a storage device may be able to issue this command in order to transfer the device reserve to another host (target) system or the target host system may issue this command to take the reserve if the specified source system holds the reserve on the device. This enables the system to be able to transfer this reserve atomically without the possibility of losing exclusive access to the device, so that data integrity is maintained throughout the transfer of the reserve, according to preferred embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a system architecture 100, in accordance with one embodiment. As shown in FIG. 1, one or more networks 102 are provided for communicating with a plurality of systems, devices, etc. A gateway may be coupled between the networks 102 and any systems, devices, etc. In the context of the present network architecture 100, the network 102 may take any form including, but not limited to a local area network (LAN), a wide area network (WAN) such as the Internet, a public switched telephone network (PSTN), an internal telephone network, a storage area network (SAN), etc. The gateway may function as a router, which is capable of directing a given packet of data that arrives at the gateway, and a switch, which furnishes the actual path in and out of the gateway for a given packet.

Further included is at least a source system 104 and a target system 108. In some embodiments, a third system 106 may be included, along with any number of additional systems, as would be apparent to one of skill in the relevant art. Each system 104, 106, 108 may be connected to the network 102 and/or to each other. For purposes of the present description, transfers are described between the source system 104 and the target system 108, with the third system 106 being capable of disrupting operations between the source system 104 and target system 108, according to various embodiments. It should be noted that each system 104, 106, 108 may be a data server, which may include any type of computing device/groupware, a host system, or any other computing system.

A control unit 110 may be coupled to each of the one or more storage devices 112a, 112b, 112c, . . . , 112n, but is not necessary. Each storage device 112a, 112b, 112c, . . . , 112n, may have a separate control unit, or may include control unit functionality, thereby rendering the control unit 110 unnecessary. In any case, a control unit 110, multiple control units, or no control may be used to communicate and/or control the storage devices 112a, 112b, 112c, . . . , 112n, based on commands issued by one or more of the systems 104, 106, 108, according to various embodiments.

Any number of storage devices may be used, and any type of storage device may be used, such as a direct access storage device (DASD), tape drive, hard disk drive, optical disk drive, non-volatile storage, etc., arranged in any configuration as would be apparent to one of skill in the art. It should be noted that the one or more storage devices 112a, 112b, 112c, . . . , 112n may be shared by two or more of the systems 104, 106, 108, according to one embodiment.

Each system 104, 106, 108, according to one embodiment, may be assigned a unique Path Group Identifier (PGID). This PGID may be used to identify the system under certain circumstances and/or situations. For example, of particular interest in the present disclosure, the PGID of a system, such as the first system 104, may be used to identify that the first system 104 holds a reserve on a particular device, such as storage device 112a. In this way, the PGID may be used as an identifier of what the system has rights to, has reserved, has access to, is currently accessing, etc. Any type of identifier may be used as the PGID as would be apparent to one of skill in the art; for example, in an IBM z/Series architecture, the PGID is a well known parameter, but is not so limited if the embodiments and/or methods described herein are used in a system that does not use an IBM z/Series architecture.

A peripheral or series of peripherals, e.g., facsimile machines, printers, networked and/or local storage units or systems, etc., may be coupled to the network 102, according to various embodiments. It should be noted that databases and/or additional components may be utilized with, or integrated into, any type of network element coupled to the network 102. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 102 may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
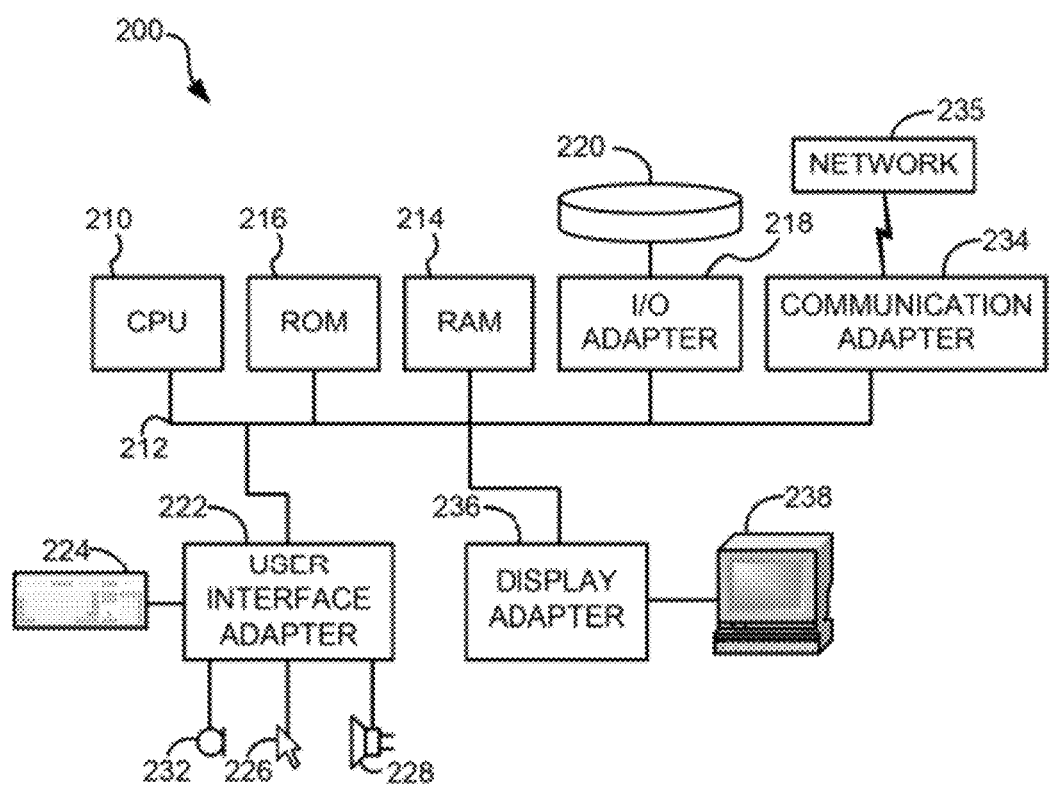
FIG. 2 shows a representative hardware environment that may be associated with the systems of FIG. 1, in accordance with one embodiment.

FIG. 2 shows a representative hardware environment associated with a system 104, 106, 108 or any user device of FIG. 1, in accordance with one embodiment. This figure illustrates a typical hardware configuration of a system 200 having a central processing unit 210, such as a microprocessor, and a number of other units interconnected via a system bus 212. Of course, a system may include more or less units than those shown in FIG. 2, according to various embodiments, and the units shown in FIG. 2 are illustrative only, and not meant to be limiting on any embodiments and/or approaches described herein.

The system 200 shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The system 200 may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

It will further be appreciated that embodiments presented herein may be provided in the form of a service deployed on behalf of a customer to offer service on demand.

In order to avoid the problems associated with typical device reserving, a new command may, in some approaches, be introduced into the software running on the host systems and on the data storage system having the device. This new command, according to one embodiment, has transfer parameter data that includes a flag (such as a single byte or string for indicating a status, referred to herein as a flag byte for simplicity) and a unique PGID for the host system being used but that did not issue the command. The flag byte, according to one embodiment, may specify a type of reserve transfer that is anticipated to occur on the device (e.g., Push or Pull). The PGID associated with the path on which the command was issued may be used as the identifier for the host system issuing the command.

When a Push Reserve bit is set in the flag byte field, then the PGID in the parameter data may identify the host system that the reserve will be given to, and the PGID for the path on which the command was issued may specify the host system in which the reserve is being held.

When the Pull Reserve bit is set in the flag byte field, then the PGID in the parameter data may identify the host system that holds the reservation, and the PGID for the path on which the command was issued may specify the host system to which the reserve will be granted.

In addition, results of the Push and Pull commands are returned to the system issuing the respective command, thereby allowing the system to have knowledge of the outcome, e.g., whether the command completed or not.

In order to handle time periods in which the reserve may be taken by another host system, the command may be failed by a control unit if the device is not reserved to the specified host system that software anticipates to be holding the reservation on the device. In one approach, this command may be an atomic command, e.g., any read/write commands and/or Unconditional Reserve operations that are issued to the device before the atomic command has completed and the new reservation has taken effect may cause the atomic command to fail. In preferred embodiments, the initiating system will be notified of the success or failure of the atomic command so that it can take appropriate action(s) to maintain data integrity.

An atomic command, by its nature, guarantees isolation from concurrent processes. In some approaches, an atomic command may include a succeed-or-fail definition, e.g., the command either successfully changes the state of the system (succeeds), or the command has no tangible effect on the system (fails).

If this command completes successfully, there is no doubt that the device will be reserved to the new host system, according to preferred embodiments. If the reservation is taken by another host system after the command, data integrity may still be maintained through other methods. If the command fails, the target system may take appropriate action(s) to maintain data integrity.

Figure 3:
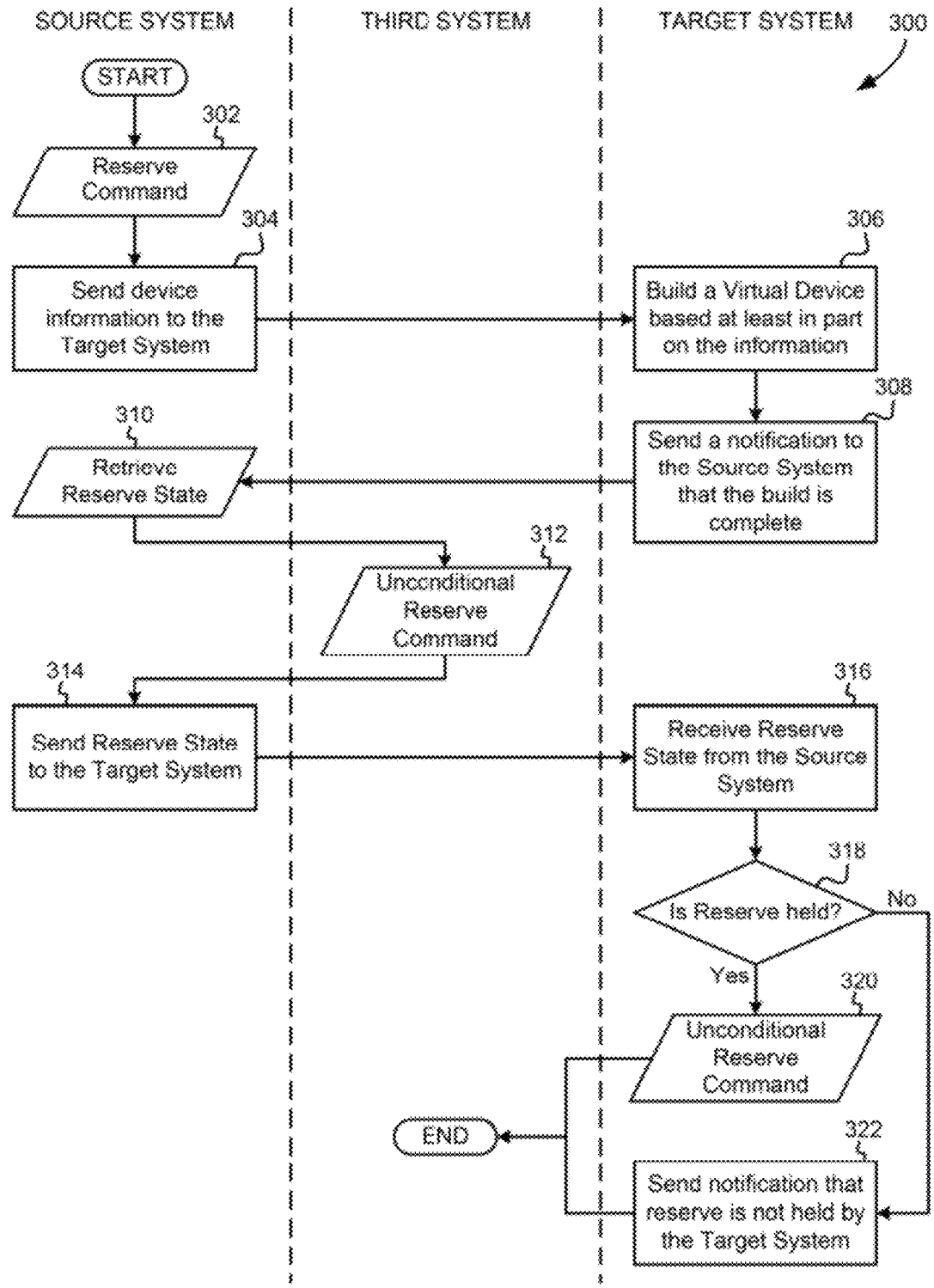
FIG. 3 shows a flowchart of a reserve transfer, according to one embodiment.

Now referring to FIG. 3, a method 300 is shown for transferring or copying a virtual device from a source system to a target system, according to one embodiment. In the descriptions below, the source system and the target system may be host systems. Also, in the context of FIG. 3, FIGS. 8-10 show operations according to several embodiments, which are described in turn.

Figure 8:
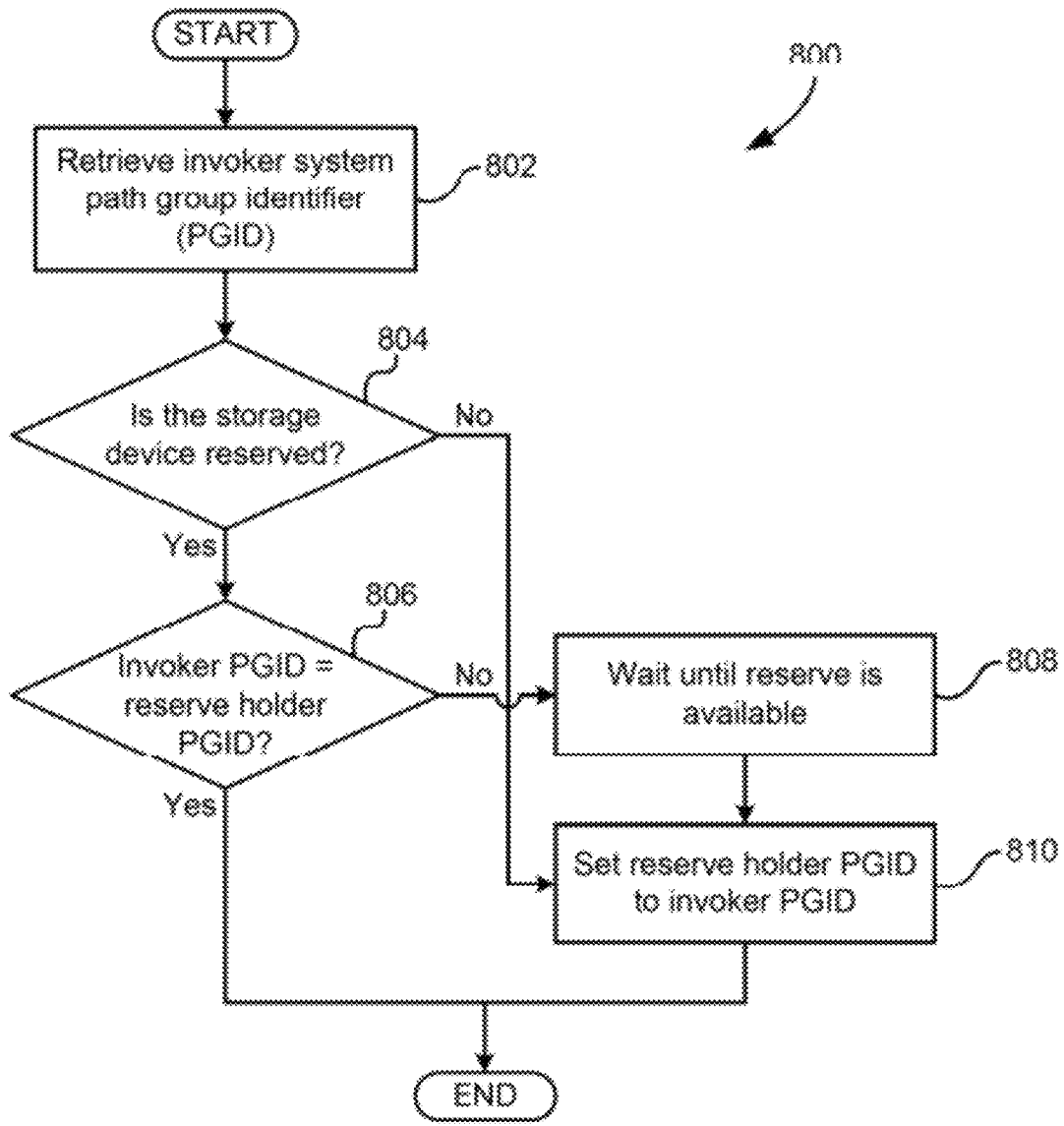
FIG. 8 shows a flowchart of a reserve command, according to one embodiment.

Referring again to FIG. 3, in operation 302, the source system issues a reserve command for a particular tape drive, direct access storage device (DASD), or any other storage device which is shared by multiple host systems. This reserve command will effectively hold the device so that it can be accessed by the reserve holder, in this case the source system. In one example, the reserve command may function as shown in FIG. 8. In addition, the system issues a release command when the reserve is no longer needed, such as the release command described in FIG. 9. Also, the source system sends device information to the target system, as shown in FIG. 3 in operation 304. In operation 306, the target system builds a virtual device that is equivalent to a virtual device on the source system using information received from the source system, and then sends an indication to the source system that the build is complete once it is completed, which takes a period of time which may include some delay, in operation 308. In operation 310, the source system retrieves the reserve state for the particular device, e.g., it retrieves the reserve state using a simple query. As shown in operation 312, at any time, a third system may issue an unconditional reserve command for the particular device that was reserved by the source system. This third system can then make changes to the data on the particular device. If operation 312 is executed after operation 310 and before operation 320, then a data integrity problem arises. Then, in operation 314, when the reserve state is sent by the source system, and in operation 316, when the reserve state is received by the target system, the data on the particular device may have been changed.

In operation 318, the reserve state of the device on the source system at the time operation 310 was executed is checked. In operation 320, if it was held (e.g., the third system did not get the reserve state until after operation 310), an unconditional reserve command is issued, such as the unconditional reserve command described in FIG. 10, by the target system to reserve the particular device so that data can be accessed on the device. Referring again to FIG. 3, if the reserve is held by the third system at the time operation 310 was executed, then in operation 322, a notification is sent indicating that the reserve has been lost (e.g., it is not held by the target system). This allows for the previous reserve holder to take appropriate action(s). Because of the possible actions by the third system during the time between operations 310 and 320, which may interrupt control of the reserve, method 300 does not have data integrity.

Now referring to FIG. 8, a method 800 is shown which represents a simplified unit flowchart for a reserve command, according to one embodiment. Of course, the method 800 may include more or less operations than those described below and shown in FIG. 8, as would be known to one of skill in the art.

FIG. 8 presents an example of a reserve command for the IBM z/series DASD reserve command that works at the device level. It is a synchronous command that does not return until the reserve state is granted to the invoker of the command. It is one method of reserving a device. Other methods may be different, including being asynchronous, according to various approaches.

In operation 802, an invoker PGID is retrieved. The invoker may be a host system, a server, etc., and the PGID may be returned using any method known in the art.

In operation 804, a first status check is performed to determine if a storage device is reserved. The storage device may be a DASD, a tape drive, or any other storage device which is capable of being shared by multiple host systems.

In operation 806, if the first status check indicates that the storage device is reserved, a second status check is performed to determine if the invoker PGID is the same as a reserve holder PGID. If so, then the reserve has been completed properly.

If the first status check indicates that the storage device is not reserved, the method 800 proceeds to operation 810.

If the second status check indicates that the invoker PGID is not the same as a reserve holder PGID, the method 800 proceeds to operation 808.

In operation 808, the method 800 is delayed until the reserve is available. Periodic status checks may be performed to determine when the reserve becomes available, such as every 1 ms, 0.5 ms, 1 second, etc., based on some other action completing, an indication being issued, etc., or any other way as known in the art.

In operation 810, the reserve holder PGID is set to the invoker PGID, thereby completing the reserve command.

Figure 9:
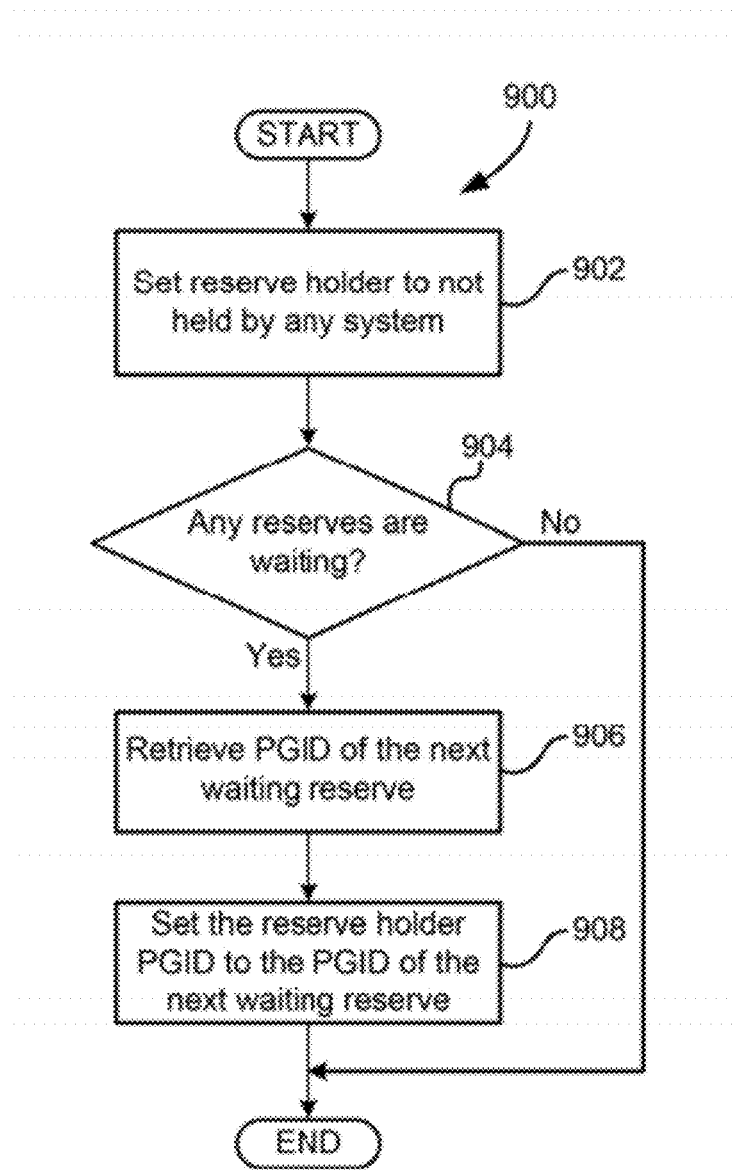
FIG. 9 shows a flowchart for a release command, according to one embodiment.

Now referring to FIG. 9, a method 900 is shown which represents a simplified unit flowchart for a release command, according to one embodiment. Of course, the method 900 may include more or less operations than those described below and shown in FIG. 9, as would be known to one of skill in the art.

In operation 902, a reserve is set to not held by any system, e.g., if the reserve is currently held by any system, it is released from being held.

In operation 904, a status check is performed to determine if there are any pending reserves, such as reserve requests issued by a host system. If no reserves are pending, then the release command is completed.

In operation 906, if reserves are pending, then the PGID of the system which issued the next pending reserve is retrieved.

In operation 908, the reserve holder PGID is set to the PGID of the system which issued the next pending reserve, and the release command is completed.

Of course, the release command may be repeated until all pending reserves are cleared, according to some approaches.

Figure 10:
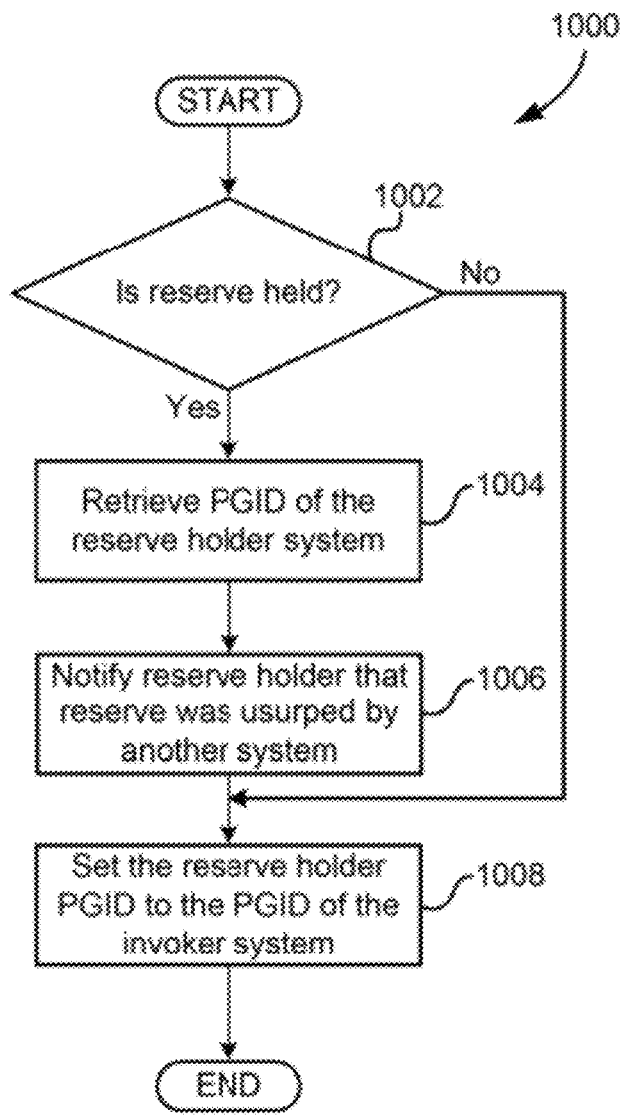
FIG. 10 shows a flowchart for an unconditional reserve command, according to one embodiment.

Now referring to FIG. 10, a method 1000 is shown which represents a simplified control unit flowchart for an unconditional reserve command, according to one embodiment. Of course, the method 1000 may include more or fewer operations than those described below and shown in FIG. 10, as would be known to one of skill in the art.

Method 1000 may be used to avoid situations where an unconditional reserve takes control of a reserve without the previous reserve holder having any notification of the unconditional reserve being processed.

In operation 1002, when an unconditional reserve is issued by any system, a status check is performed to determine if a system currently holds the reserve for which the unconditional reserve was issued. If the reserve is not currently being held, the method 1000 proceeds to operation 1008.

If the reserve is currently being held, then in operation 1004, a PGID for the reserve holder is retrieved.

In operation 1006, the reserve holder is notified that the reserve has been usurped by another system. In one approach, the PGID of the system which issued the unconditional reserve may be queried by the reserve holder system.

In operation 1008, the reserve holder PGID is set to the invoker system's PGID (e.g., the system which issued the unconditional reserve).

Figure 4:
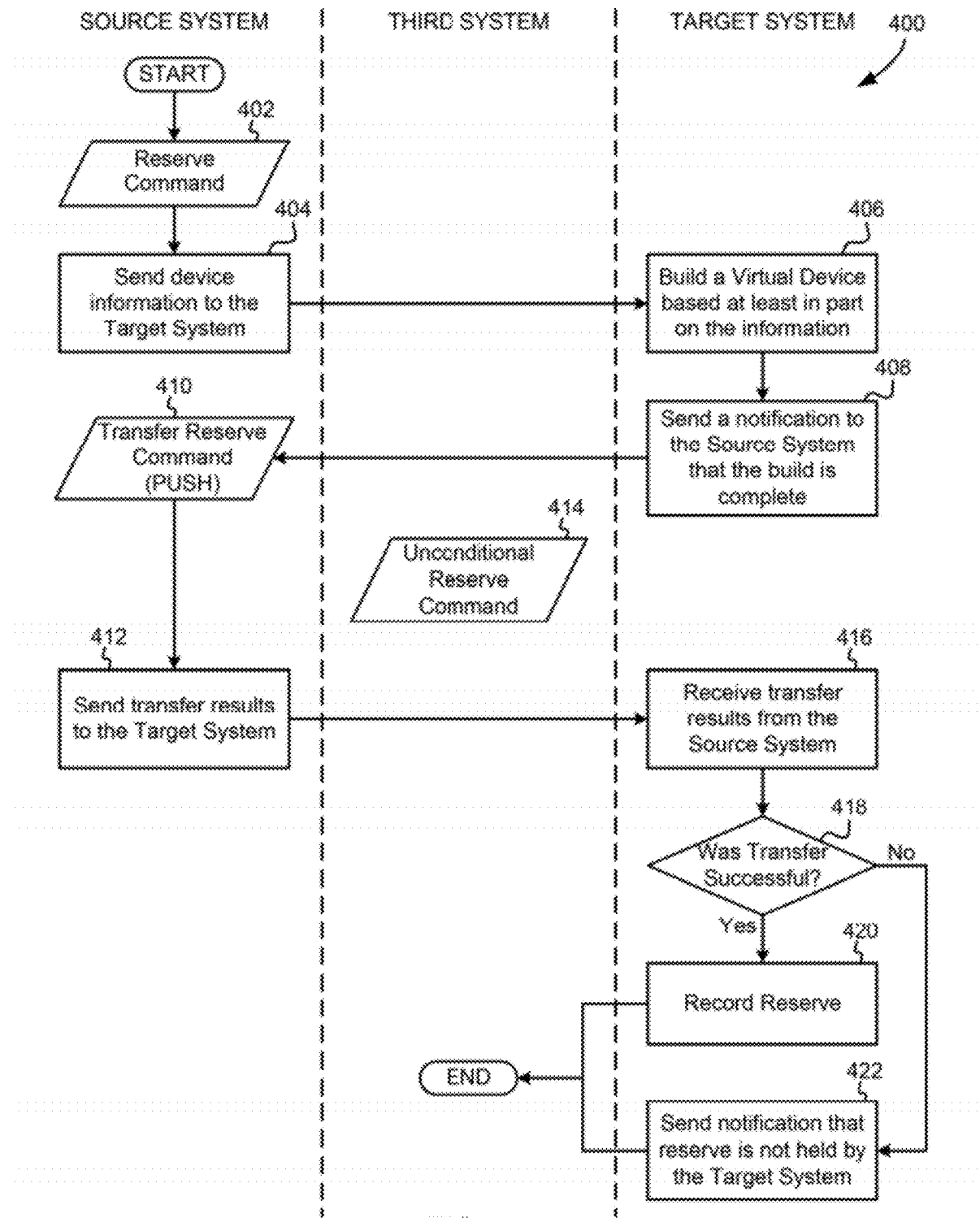
FIG. 4 shows a flowchart of a method for transferring or copying a virtual device, according to one embodiment.

Now referring to FIG. 4, a method 400 is shown for transferring or copying a virtual device from a source system to a target system, according to one embodiment. In this embodiment, a tape drive, a storage library, a DASD, or any other storage device(s) which is shared by multiple hosts may be a device on which a virtual device is located. In the descriptions below, the source system, the target system, and/or the third system may be host systems.

The method 400 may be carried out in any desired environment, including but not limited to, those shown in FIGS. 1-2, according to various embodiments. Of course, the method 400 may include more or less operations than those described below and shown in FIG. 4, as would be known to one of skill in the art.

In operation 402, the source system issues a reserve command for a particular tape drive, direct access storage device (DASD), or any other storage device which is capable of being shared by multiple host systems. This reserve command will effectively hold the device so that it can be accessed by the reserve holder, in this case the source system.

In operation 404, the source system sends device information to the target system. The device information which is sent to the target system provides details of the virtual device which is to be copied or transferred to the target system.

In operation 406, the target system builds a virtual device that is equivalent to a virtual device on the source system using information received from the source system. Any method to construct a virtual device may be used, as known to one of skill in the art.

In operation 408, the target system sends an indication to the source system that the build is complete once it is completed.

In operation 410, the source system issues a transfer reserve command for the particular device so that it can transfer it to the target system, which is a push command. For details of a push command, refer to FIG. 5 which shows a push command, according to one embodiment. In this case, instead using a two-step process of getting the reserve state and then doing an unconditional reserve (as performed in method 300 of FIG. 3), a new reserve push command is issued which forces a response on whether the reserve push worked or not. Referring again to FIG. 4, at this point in method 400, it is known whether the reserve push command worked or not, since the reserve push command is an atomic command.

In operation 412, the transfer results are sent to the target system.

At any point during this process, an unconditional reserve command may be issued by a third system, as indicated by operation 414. However, this unconditional reserve command will not affect the method 400 because a control unit provides integrity at that level, even if the unconditional reserve command is issued after the reserve push worked. There are no data integrity problems because the control unit will provide notification of the unconditional reserve.

In operation 416, the transfer results are received by the target system. After knowing whether the reserve push command worked or not, the target system may perform appropriate actions based on the results.

In operation 418, a status check is performed on the reserve of whether it is held by the target system or not. In method 400, this check returns a positive result indicating the reserve is held unless an Unconditional Reserve command issued by the third system completes prior to the reserve push command completing.

In operation 420, if it is held (e.g., the third system did not get the reserve state), the reserve is recorded by the target system so that the data can be accessed on the particular device.

In operation 422, if the reserve is not held by the target system (e.g., the third system holds the reserve, the third system held the reserve and then released it, another system took the reserve from a system holding the reserve, etc.; all occurring prior to the reserve push), then a notification is sent indicating that the reserve is not held. This allows for the previous reserve holder to take appropriate action.

Figure 5:
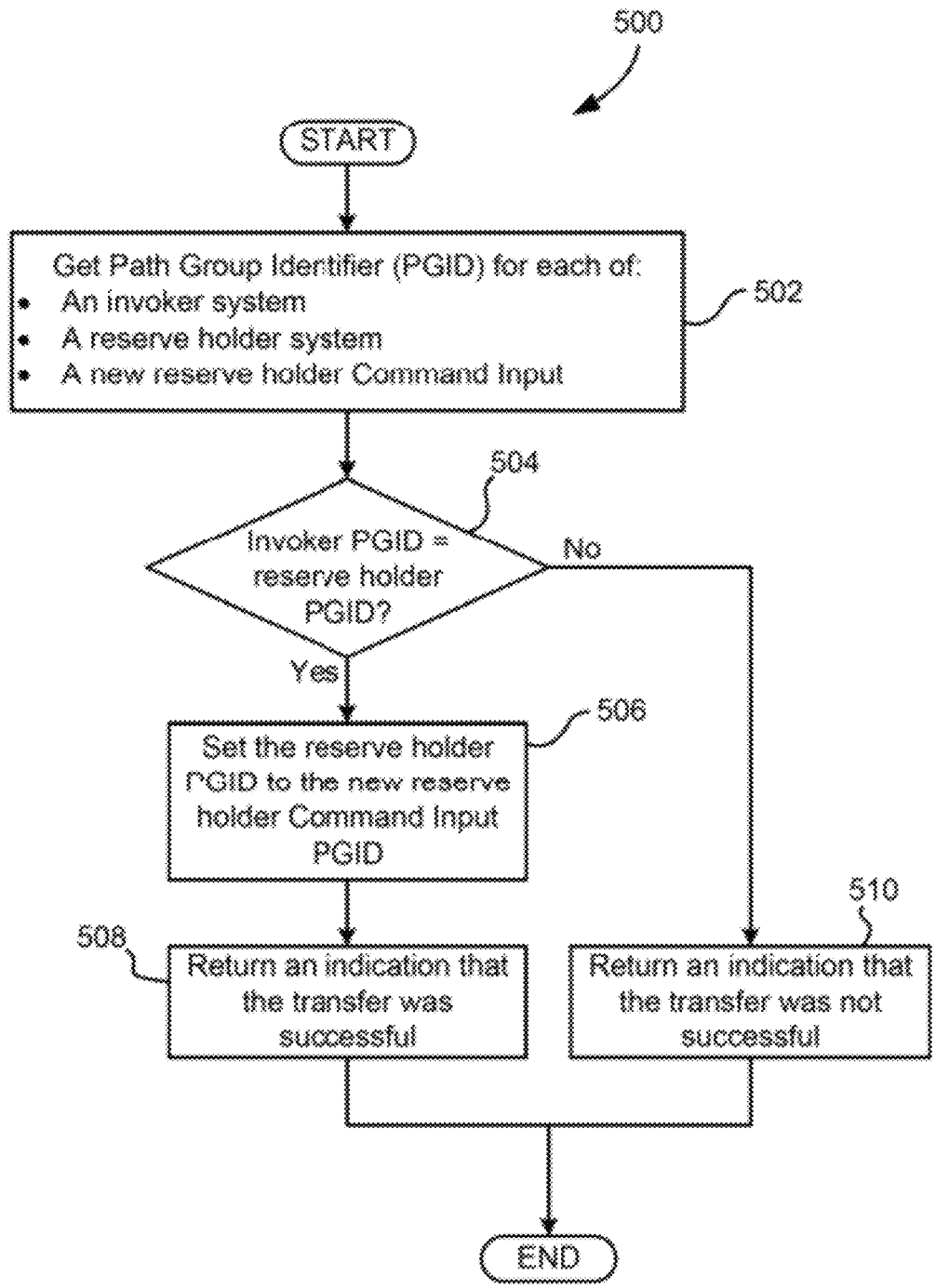
FIG. 5 shows a flowchart of a reserve push command, according to one embodiment.

Now referring to FIG. 5, a method 500 is shown which represents a reserve push command, as shown in operation 410 of FIG. 4, according to one embodiment. This represents an atomic command as far as affected systems are concerned, e.g., a command which requires certain criteria to be met before the command is completed. As shown in FIG. 5, only one I/O is allowed to a device from any Path Group at any given time. Also, the control unit locks out any unconditional reserves that may be issued for the device, preferably by serializing the commands.

The method 500 may be carried out in any desired environment, including but not limited to, those shown in FIGS. 1-2, and 4, according to various embodiments. Of course, the method 500 may include more or less operations than those described below and shown in FIG. 5, as would be known to one of skill in the art.

In operation 502, a PGID is retrieved for each of an invoker (the system that is issuing the request, such as the source system), a reserve holder (whichever system holds the reserve), and a new reserve holder command input (a system which will access the reserve, such as the target system).

In operation 504, a status check is performed to determine if the reserve holder PGID is the invoker PGID, which indicates that the reserve holder is the source system. If it is not, then an unconditional reserve was received prior to this check, the reserve was released prior to the check, etc.

In operation 506, if the reserve holder PGID is the same as the invoker PGID, then the reserve holder PGID is set as the command input PGID. Then, in operation 508, an indication that the reserve transfer was successful is returned.

In operation 510, if the reserve holder PGID is not the same as the invoker PGID, an indication that the reserve transfer was not successful is returned.

Figure 6:
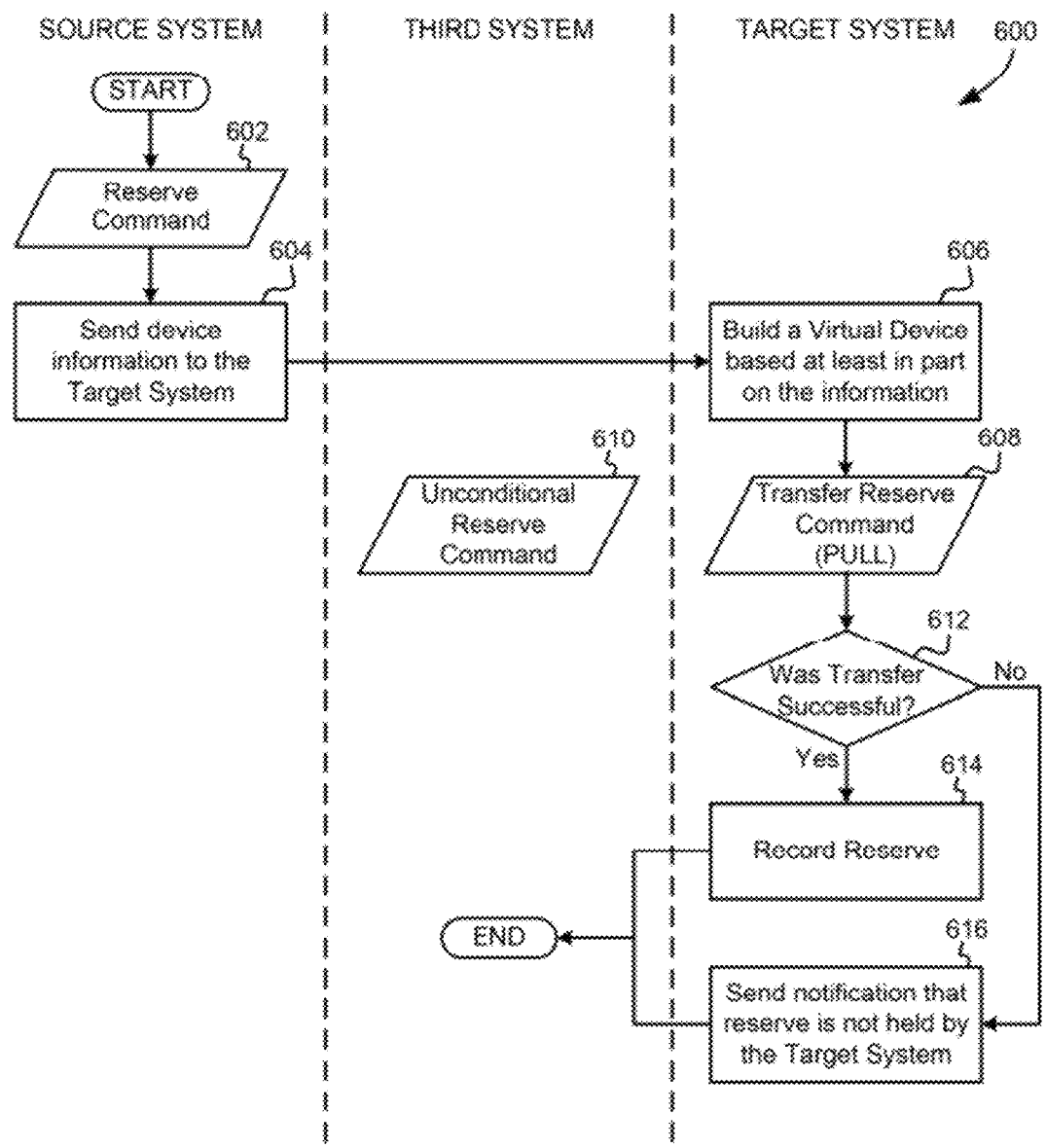
FIG. 6 shows a flowchart of a method for transferring or copying a virtual device, according to one embodiment.

Now referring to FIG. 6, a method 600 is shown for transferring or copying a virtual device from a source system to a target system, according to one embodiment. In this embodiment, a tape drive, a DASD, or any other storage device which is shared by multiple hosts may be the device whose data integrity is to be protected. In the descriptions below, the source system and the target system may be host systems.

The method 600 may be carried out in any desired environment, including but not limited to, those shown in FIGS. 1-2, according to various embodiments. Of course, the method 600 may include more or less operations than those described below and shown in FIG. 6, as would be known to one of skill in the art.

In operation 602, the source system issues a reserve command for a particular tape drive, DASD, or any other storage device which is shared by multiple host systems. This reserve command will effectively hold the device so that it can be accessed by the reserve holder, in this case the source system.

In operation 604, the source system sends device information to the target system. The device information which is sent to the target system provides details of the virtual device which is to be copied or transferred to the target system.

In operation 606, the target system builds a virtual device that is equivalent to a virtual device on the source system using information received from the source system. Any method to construct a virtual device may be used, as known to one of skill in the art.

Figure 7:
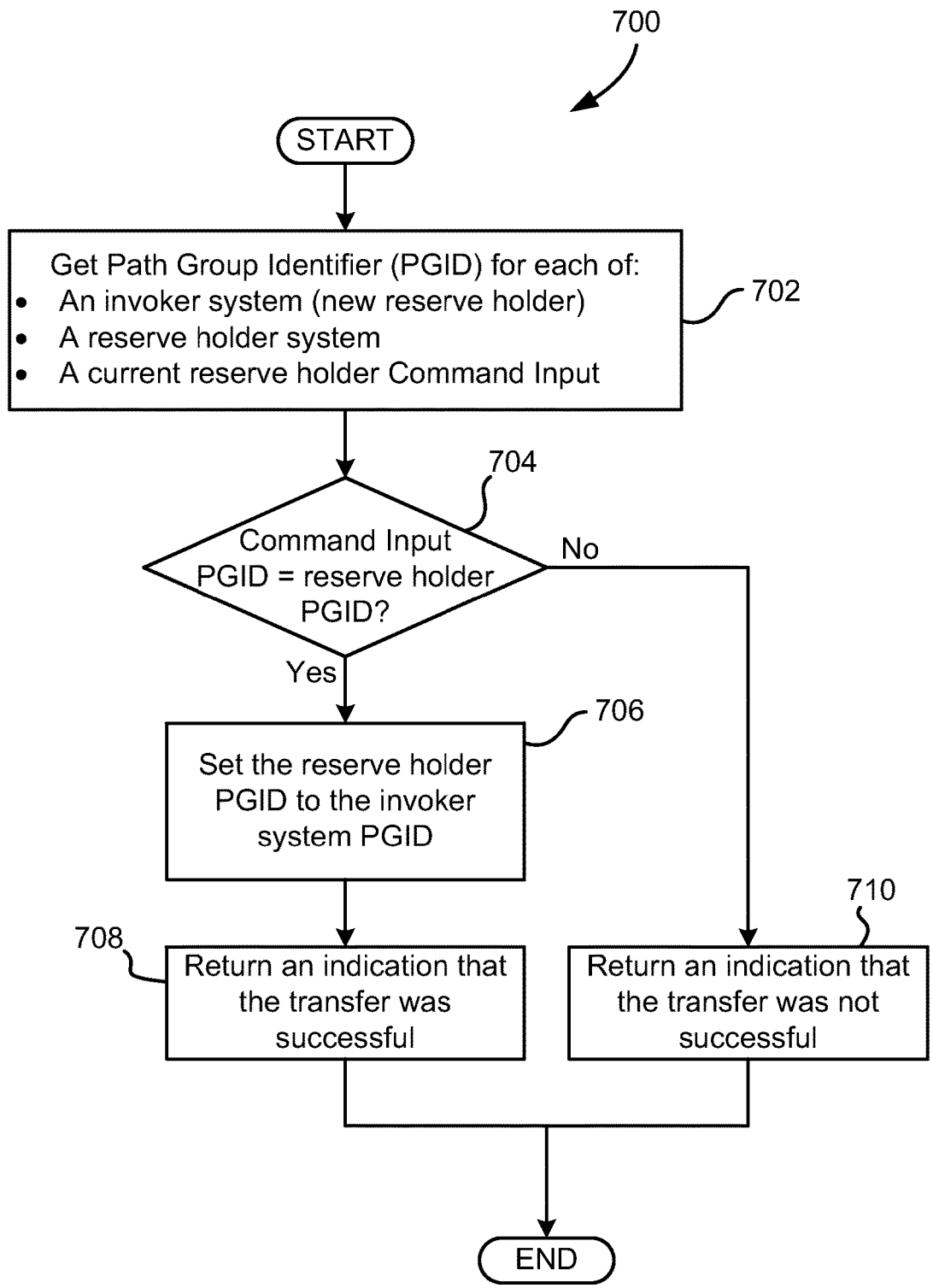
FIG. 7 shows a flowchart of a reserve pull command, according to one embodiment.

In operation 608, the target system issues a transfer reserve command for the particular device so that it can transfer it from the source system, which is a pull command. In this case, instead using a two step process of getting the reserve state and then doing an unconditional reserve (as performed in method 300 of FIG. 3), a new reserve pull command is issued which forces a response on whether the reserve pull worked or not. Therefore, referring again to FIG. 6, at this point in method 600, it is known whether the reserve pull command worked or not, since the reserve pull command is an atomic command. One example of a reserve pull command is shown in FIG. 7.

This pull command may be preferable to a push command as shown in FIG. 4, according to some embodiments, such as those working with shared devices, for example. The word 'shared' when describing devices in the description of FIG. 6 may have a different meaning from the word 'shared' in reference to FIG. 1. In this case, 'shared' may refer to sharing a single real device between two or more users (such as guests, hosts, virtual devices, etc., depending on the terminology deployed) on a system, with the system simulating the reserve function. However, this is only an example, because the pull command could also be used by real host systems sharing a real device, as in FIG. 1.

Referring again to FIG. 6, at any point during this process, an unconditional reserve command may be issued by a third system, as indicated by operation 610 of FIG. 6. However, this unconditional reserve command will not affect the method 600 because a control unit provides integrity at that level, even if the unconditional reserve command is issued after the reserve push worked, so that there are no data integrity problems.

In operation 612, a status check is performed on the reserve of whether it is held by the target system or not. In method 600, this check returns a positive result indicating the reserve is held unless an Unconditional Reserve command issued by the third system completes prior to the reserve pull command completing.

In operation 614, if it is held (e.g., the third system did not get the reserve state), the reserve is recorded by the target system so that the data can be accessed on the particular device.

In operation 616, if the reserve is not held by the target system (e.g., the third system holds the reserve, the third system held the reserve and then released it, another system took the reserve from a system holding the reserve, etc.), then a notification is sent indicating that the reserve is not transferred. This allows for the previous reserve holder to take appropriate action.

Now referring to FIG. 7, a method 700 is shown which represents a reserve pull command, as shown in operation 608 of FIG. 6, according to one embodiment. This represents an atomic command, e.g., a command which requires certain criteria to be met before the command is completed. As shown in FIG. 7, only one I/O is allowed to a device from any Path Group at any given time. Also, the control unit locks out any unconditional reserves that may be issued for the device, preferably by serializing the commands.

The method 700 may be carried out in any desired environment, including but not limited to, those shown in FIGS. 1-2, and 6, according to various embodiments. Of course, the method 700 may include more or less operations than those described below and shown in FIG. 7, as would be known to one of skill in the art.

In operation 702, a PGID is retrieved for each of an invoker (the system that is the new reserve holder, such as the target system), a reserve holder (whichever system holds the reserve), and a current reserve holder command input (a system which holds the reserve, such as the source system).

In operation 704, a status check is performed to determine if the current reserve holder command input PGID is the reserve holder PGID, which indicates that the reserve holder is the source system. If it is not, then an unconditional reserve was received prior to this check, the reserve was released prior to the check, etc.

In operation 706, if the current reserve holder command input PGID is the same as the reserve holder PGID, then the reserve holder PGID is set as the invoker PGID. Then, in operation 708, an indication that the reserve transfer was successful is returned.

In operation 710, if the current reserve holder command input PGID is not the same as the reserve holder PGID, an indication that the reserve transfer was not successful is returned.

According to various embodiments, a system may have logic adapted to perform some or all operations from any of methods 300, 400, 500, 600, 700, 800, 900, and 1000, alone or in conjunction with operations of any other methods.

In more embodiments, a computer program product for transferring a virtual device may include a computer readable storage medium having computer readable program code embodied therewith. The computer readable program code may be configured to perform some or all operations from any of methods 300, 400, 500, 600, 700, 800, 900, and 1000, alone or in conjunction with operations of any other methods.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A host system, comprising:
a hardware processor;
a memory; and
logic stored in the memory and executable by the processor, the logic being configured to:
receive device information about a first device, the device information being received by a host system from a source system;
build a virtual device on the host system that is equivalent to a virtual device on the source system based at least in part on the received device information;
set a flag byte in a command input for a new reserve holder specifying whether a push command or a pull command will transfer a reserve of the first device, wherein the new reserve holder is the host system;
initiate, using the host system, transfer of the reserve of the first device from the source system to the host system by sending an indication to the source system that the virtual device build is complete in response to completion of the virtual device build, wherein the reserve of the first device is transferred using a synchronous push command at the source system, the synchronous push command forcing a response that indicates whether the push command was successful or unsuccessful, wherein the synchronous push command comprises:
retrieving a path group identifier (PGID) for each of:
an invoker system, a reserve holder system, and the command input for the new reserve holder;
determining whether the PGID of the reserve holder system is the same as the PGID of the invoker system; and
in response to a determination that the PGID of the reserve holder system is the same as the PGID of the invoker system:
setting the PGID of the reserve holder system to the PGID of the command input for the new reserve holder; and
sending a notification to the invoker system that transferring the reserve was successful;
receive results from the source system at the host system of transferring the reserve of the first device to the host system indicating a successful transfer in response to a determination that the synchronous push command was successful and indicating an unsuccessful transfer in response to a determination that the synchronous push command was unsuccessful;

record, in response to receiving the results, the reserve in response to a determination that a status check on the reserve indicates that the reserve is held by the host system; and send a notification that the reserve is not held by the host system in response to a determination that the status check on the reserve indicates that the reserve is not held by the host system.

2. The host system as recited in claim 1, wherein the indication that the virtual device build is complete is sent prior to receiving the results from the source system of the transferring of the reserve, wherein the synchronous push command is an unconditional reserve command issued by the source system to hold the reserve for the host system, wherein the source system is the invoker system the reserve holder system, wherein the flag byte in the command input specifies that the synchronous push command will transfer the reserve, and wherein the logic is further configured to:

perform a status check periodically to determine whether the reserve is available for transfer to the host system;

delay the synchronous push command until the source system determines that the reserve is available for transferring to the host system;

receive a release command for the reserve;

set the reserve to not held by any system thereby forcing any system which currently holds the reserve to release the reserve from being held;

perform a status check to determine whether any system has issued a pending reserve;

in response to a determination that no reserves are pending, complete the release command;

in response to a determination that reserves are pending:
  retrieve a PGID of the system which issued a next pending reserve;
  set the reserve holder PGID to the PGID of the system which issued the next pending reserve; and
  complete the release command.

3. The host system as recited in claim 1, wherein the logic is further configured to:

delay the synchronous push command until the source system determines that the reserve is available for transferring to the host system; and perform a status check periodically to determine whether the reserve is available for transfer to the host system, wherein the source system is the invoker system and the reserve holder system.

4. The host system as recited in claim 1, wherein the synchronous push command is an unconditional reserve command issued by the source system to hold the reserve for the host system.

5. The host system as recited in claim 4, wherein the logic is further configured to delay the synchronous push command until the source system determines that the reserve is available for transferring to the host system.

6. The host system as recited in claim 1, wherein the logic is further configured to delay the synchronous push command until the source system determines that the reserve is available for transferring to the host system.

7. The host system as recited in claim 6, wherein the logic is further configured to perform a status check periodically to determine whether the reserve is available for transfer to the host system.

8. A source system, comprising:
a hardware processor;
a memory; and
logic stored in the memory and executable by the processor, the logic being configured to:
  create a reserve of a first device;
  send device information about the first device to a target system;
  receive an indication that a virtual device build is complete from the target system;
  set a flag byte in a command input for a new reserve holder specifying whether a push command or a pull command will transfer the reserve of the first device, wherein the new reserve holder is the target system;
  perform a status check periodically to determine whether the reserve is available for transfer to the target system;
  transfer the reserve of the first device from the source system to the target system using a synchronous push command at the source system in response to receiving the indication that the virtual device build is complete, the synchronous push command forcing results to be sent from the source system to the target system indicating whether the push command was successful or unsuccessful, the synchronous push command comprising:
    retrieving a path group identifier (PGID) for each of:
      an invoker system, a reserve holder system, and the command input for the new reserve holder;
    determining whether the PGID of the reserve holder system is the same as the PGID of the invoker system; and
    in response to a determination that the PGID of the reserve holder system is the same as the PGID of the invoker system, setting the PGID of the reserve holder system to the PGID of the command input for the new reserve holder and sending a notification to the invoker system that transferring the reserve was successful;
  delay the synchronous push command until the source system determines that the reserve is available for transferring to the target system;
  send the results of the transferring of the reserve from the source system to the target system indicating a successful transfer in response to a determination that the synchronous push command was successful;
  send the results of the transferring of the reserve from the source system to the target system indicating an unsuccessful transfer in response to a determination that the synchronous push command was unsuccessful; and
  receive a notification that the reserve is not held by the target system in response to a status check on the reserve performed by the target system indicating that the reserve is not held by the target system.

9. The source system as recited in claim 8, wherein the source system initiates the transferring of the reserve.

10. The source system as recited in claim 8, wherein the synchronous push command is an unconditional reserve command issued by the source system to hold the reserve for the target system, wherein the flag byte in the command input specifies that the synchronous push command will transfer the reserve, wherein the logic is further configured to:

delay for an amount of time after determining whether the PGID of the reserve holder system is the same as the PGID of the invoker system and in response to another determination that the PGID of the command input for the new reserve holder is not the same as the PGID of the invoker system after the amount of time, send a notification to the target system that transferring the reserve was not successful;
receive a release command for the reserve;
set the reserve to not held by any system thereby forcing any system which currently holds the reserve to release the reserve from being held;
perform a status check to determine whether any system has issued a pending reserve;
in response to a determination that no reserves are pending, complete the release command;
in response to a determination that reserves are pending:
retrieve a PGID of the system which issued a next pending reserve;
set the reserve holder PGID to the PGID of the system which issued the next pending reserve; and
complete the release command.

11. The source system as recited in claim 10, wherein the invoker system is the source system, and the reserve holder system is the source system.

12. A computer program product for transferring a virtual device, the computer program product comprising:
a non-transitory computer readable storage medium having computer readable program code embodied therewith, the computer readable program code comprising:
computer readable program code configured to receive device information about a first device, the device information being received by a target system from a source system;
computer readable program code configured to build a virtual device on the target system that is equivalent to a virtual device on the source system based at least in part on the received device information;
computer readable program code configured to set a flag byte in a command input for a new reserve holder specifying whether a push command or a pull command will transfer a reserve of the first device, wherein the new reserve holder is the target system;
computer readable program code configured to initiate, using the target system, transfer of the reserve of the first device from the source system to the target system by sending an indication to the source system that the virtual device build is complete in response to completion of the virtual device build, wherein the reserve of the first device is transferred using a synchronous push command at the source system, the synchronous push command forcing a response that indicates whether the synchronous push command was successful or unsuccessful, wherein the computer readable program code configured to initiate transfer of the reserve to the target system further comprises:
computer readable program code configured to retrieve a path group identifier (PGID) for each of: an invoker system, a reserve holder system, and the command input for the new reserve holder;
computer readable program code configured to determine whether the PGID of the reserve holder system is the same as the PGID of the invoker system; and
computer readable program code configured to set the PGID of the reserve holder system to the PGID of the command input for the new reserve holder and send a notification to the invoker system that transferring the reserve was successful in response to a determination that the PGID of the reserve holder system is the same as the PGID of the invoker system;
computer readable program code configured to receive results of transferring the reserve of the first device from the source system to the target system indicating a successful transfer in response to a determination that the synchronous push command was successful and indicating an unsuccessful transfer in response to a determination that the synchronous push command was unsuccessful;
computer readable program code configured to record, in response to receiving the results, the reserve in response to a status check on the reserve indicating that the reserve is held by the target system; and
computer readable program code configured to send a notification that the reserve is not held by the target system in response to the status check on the reserve indicating that the reserve is not held by the target system.

13. The computer program product as recited in claim 12, wherein the indication that the virtual device build is complete is sent prior to receiving the results from the source system of the transferring of the reserve, wherein the synchronous push command is an unconditional reserve command issued by the source system to hold the reserve for the target system, wherein the source system is the invoker system and the reserve holder system, wherein the flag byte in the command input specifies that the synchronous push command will transfer the reserve, wherein the computer readable program code further comprises computer readable program code configured to delay the synchronous push command until the source system determines that the reserve is available for transferring to the target system, and wherein the computer readable program code configured to transfer the reserve comprises:
computer readable program code configured to perform a status check periodically to determine whether the reserve is available for transfer to the target system; and
computer readable program code configured to send a notification to the invoker system that transferring the reserve was not successful in response to a determination that the PGID of the command input for the new reserve holder is not the same as the PGID of the reserve holder system;
computer readable program code configured to receive a release command for the reserve;
computer readable program code configured to set the reserve to not held by any system thereby forcing any system which currently holds the reserve to release the reserve from being held;
computer readable program code configured to perform a status check to determine whether any system has issued a pending reserve;
computer readable program code configured to complete the release command in response to a determination that no reserves are pending;
in response to a determination that reserves are pending:
computer readable program code configured to retrieve a PGID of the system which issued a next pending reserve;
computer readable program code configured to set the reserve holder PGID to the PGID of the system which issued the next pending reserve; and
computer readable program code configured to complete the release command.

14. The computer program product as recited in claim 13, wherein the indication that the virtual device build is complete is sent prior to receiving the results from the source system of the transferring of the reserve.

15. A host system, comprising:
a hardware processor;
a memory; and
logic stored in the memory and executable by the processor, the logic being configured to:
issue, from a host system to a source system, a reserve command for a first device;
receive device information about the first device in response to the reserve command, the device information being received by the host system from the source system;
build a virtual device on the host system that is equivalent to a virtual device on the source system based at least in part on the received device information;
transfer the reserve of the first device, using the host system, from the source system to the host system using a synchronous pull command, the synchronous pull command forcing a response regarding whether the synchronous pull command was successful or unsuccessful, the synchronous pull command comprising:
retrieving a path group identifier (PGID) for each of:
an invoker system, a reserve holder system, and a command input for a new reserve holder;
determining whether the PGID of the reserve holder system is the same as the PGID of the invoker system;
setting the PGID of the reserve holder system to the PGID of the command input for the new reserve holder and sending a notification to the invoker system that transferring the reserve was successful in response to a determination that the PGID of the reserve holder system is the same as the PGID of the invoker system; and
sending a notification to the invoker system that transferring the reserve was not successful in response to a determination that the PGID of the reserve holder system is not the same as the PGID of the invoker system;
receive results from the source system at the host system of transferring the reserve of the first device to the host system either indicating that the reserve is held by the host system in response to a determination that the synchronous pull command was successful or indicating that the reserve is not held by the host system in response to a determination that the synchronous pull command was unsuccessful;
record, in response to receiving the results, the reserve in response to a determination that a status check on the reserve indicates that the reserve is held by the host system after a successful synchronous pull command of the reserve from the source system to the host system; and
send a notification that the reserve is not held by the host system in response to a determination that the status check on the reserve indicates that the reserve is not held by the host system after an unsuccessful synchronous pull command of the reserve from the source system to the host system.

16. The host system as recited in claim 15, wherein the invoker system is the host system and the reserve holder system is the source system.

17. The host system as recited in claim 16, wherein the logic is further configured to perform a status check periodically to determine whether the reserve is available for transfer to the host system.

18. The host system as recited in claim 15, wherein the synchronous pull command is an atomic unconditional reserve command issued by the host system to obtain the reserve from the source system.

19. The host system as recited in claim 15, wherein the logic is further configured to:
delay the synchronous pull command until the host system determines that the reserve is available for transferring;
perform a status check periodically to determine whether the reserve is available for transfer to the host system;
set a flag byte in the command input specifying that the synchronous pull command will transfer the reserve of the first device;
receive a release command for the reserve;
set the reserve to not held by any system thereby forcing any system which currently holds the reserve to release the reserve from being held;
perform a status check to determine whether any system has issued a pending reserve;
in response to a determination that no reserves are pending, complete the release command;
in response to a determination that reserves are pending:
retrieve a PGID of the system which issued a next pending reserve;
set the reserve holder PGID to the PGID of the system which issued the next pending reserve; and
complete the release command.

20. The host system as recited in claim 19, wherein the synchronous pull command is an atomic unconditional reserve command issued by the host system to obtain the reserve from the source system.

* * * * *